United States Patent
Burok et al.

(10) Patent No.: US 6,707,903 B2
(45) Date of Patent: Mar. 16, 2004

(54) AUTOMATED WORKFLOW METHOD FOR ASSIGNING WORK ITEMS TO RESOURCES

(75) Inventors: Didina Burok, Matawan, NJ (US); Andrew D. Flockhart, Thornton, CO (US); James M. Landwehr, Summit, NJ (US); Colin Lingwood Mallows, Flemington, NJ (US); Sami Joseph Qutub, Freehold, NJ (US); Rafal Sitkowski, Lakewood, NJ (US); Leta G. Herman, Belchertown, MA (US); Peter J. Matteo, Eatontown, NJ (US); Larry John Roybal, Westminster, CO (US); Robert C. Steiner, Broomfield, CO (US); Wen-Hua Ju, Monmouth Junction, NJ (US); Gail Levenelm, Brielle, NJ (US)

(73) Assignee: Avaya, Inc., Lincroft, NJ (US)

( * ) Notice: Subject to any disclaimer, the term of this patent is extended or adjusted under 35 U.S.C. 154(b) by 0 days.

(21) Appl. No.: 10/358,640

(22) Filed: Feb. 5, 2003

(65) Prior Publication Data

US 2003/0152212 A1 Aug. 14, 2003

Related U.S. Application Data

(63) Continuation of application No. 09/461,902, filed on Dec. 15, 1999.

(51) Int. Cl.[7] ............................................. H04M 3/00
(52) U.S. Cl. ........................... 379/265.02; 379/265.05; 379/265.1; 379/265.12; 379/266.01
(58) Field of Search ...................... 379/265.02, 265.05, 379/265.1, 265.12, 266.01

(56) References Cited

U.S. PATENT DOCUMENTS

| 6,130,942 A | * | 10/2000 | Stenlund ................ 379/265.12 |
| 6,463,346 B1 | * | 10/2002 | Flockhart et al. ........... 700/102 |
| 6,493,447 B1 | * | 12/2002 | Goss et al. ............ 379/265.09 |
| 6,553,114 B1 | * | 4/2003 | Fisher et al. ........... 379/265.12 |

* cited by examiner

Primary Examiner—Jack Chiang
Assistant Examiner—Quynh H. Nguyen
(74) Attorney, Agent, or Firm—Patton Boggs LLP

(57) ABSTRACT

An automated method for servicing a plurality of work items within committed times. A workflow including two or more work activities is assigned for each of the plurality of work items and a commitment is assigned either to each workflow or to each work item in each workflow. Queued work items are automatically assigned to a next available agent based on an activity state. A short-term predictor provides early detection of work items that are at risk of failing to meet their commitments. A long-term predictor detects backlogs of work items where excessive delays in queue are likely to put work items at risk of failing to meet their commitments. An activity's state can also cause additional reserve and backup agents to be assigned to it, to service work items from its queue before their commitments are missed.

33 Claims, 8 Drawing Sheets

| | LOWER THRESHOLD 140 | UPPER THRESHOLD 150 | CRITICAL THRESHOLD 160 |
|---|---|---|---|
| ACTIVITY 1 | – | 10% | – |
| ACTIVITY 2 | – | 40% | – |
| ACTIVITY 3 | 60% | 75% | 80% |

| ACTIVITY STATE | MEANING | FORMULA |
|---|---|---|
| CRITICAL | ONE OR MORE WORK ITEMS IN THE ACTIVITY QUEUE ARE FAR BEHIND SCHEDULE | ACP > CRITICAL THRESHOLD |
| BEHIND TARGET | ONE OR MORE WORK ITEMS IN THE ACTIVITY QUEUE ARE BEHIND SCHEDULE | ACP > UPPER THRESHOLD |
| ON TARGET – IMMEDIATE RISK | ONE OR MORE WORK ITEMS IN THE ACTIVITY QUEUE ARE IN IMMINENT DANGER OF FALLING BEHIND SCHEDULE | PCP > UPPER THRESHOLD |
| ON TARGET – FUTURE RISK | ONE OR MORE WORK ITEMS IN THE ACTIVITY QUEUE ARE IN DANGER OF FALLING BEHIND SCHEDULE AT SOME TIME IN THE FUTURE | ECP > UPPER THRESHOLD |
| ON TARGET | ALL WORK ITEMS IN THE ACTIVITY QUEUE ARE ON SCHEDULE | PCP <= UPPER THRESHOLD |
| AHEAD OF TARGET | ALL WORK ITEMS IN THE ACTIVITY QUEUE ARE AHEAD OF SCHEDULE AND DOING BETTER THAN REQUIRED | ACP < LOWER THRESHOLD |
| QUEUE EMPTY | NO WORK ITEMS IN THE ACTIVITY QUEUE | |
| RESOURCES AVAILABLE | ONE OR MORE BACK OFFICE AGENTS ARE AVAILABLE | |

FIG. 9

| ACTIVITY QUEUE | ROLE | ACTIVATION LEVEL |
|---|---|---|
| 1 | REGULAR | ON-TARGET |
| 2 | REGULAR | ON-TARGET |
| 3 | RESERVE | FUTURE<br>IMMEDIATE<br>BEHIND<br>CRITICAL |
| 4 | RESERVE | FUTURE<br>IMMEDIATE<br>BEHIND<br>CRITICAL |
| 5 | BACK-UP | ON-TARGET<br>FUTURE<br>IMMEDIATE<br>BEHIND<br>CRITICAL |

AUTOMATED WORKFLOW METHOD FOR ASSIGNING WORK ITEMS TO RESOURCES

CROSS REFERENCE TO RELATED CASES

This application is a continuation of pending patent application Ser. No. 09/461,902 titled "Method and Apparatus for Service State-Based Processing of Communications in a Call Center", filed on Dec. 15, 1999.

FIELD OF THE INVENTION

This invention relates generally to work scheduling and more specifically to an automated method for assigning resources to work items.

Problem

It is a problem in the field of customer service centers to provide a method for assigning a plurality of work items— either tangible or intangible such as calls, queries, or requests—to a plurality of resources such as back office agents that each have skills corresponding to one or more work activities, while also meeting customer commitments assigned to individual work items. A business process is defined by a workflow which includes a plurality of activities or steps that are to be completed in an assigned order by back office agents having the skill to complete each particular work activity. Each back office agent has a set of skills for performing one or more work activities associated with the work items. Generally, back office agents operate in a "pull" mode wherein the back office agents are empowered to select work items at their own pace and on their own initiative.

Workflow managers usually set goals for moving a work item through the workflow by some point in time or within some period of time. These goals can often become frustrated. For example:

One or more work items may become queued, waiting for a back office agent with the appropriate skills to become available, thereby wasting precious time in achieving the goal.

Agents having a skill to perform a later activity in the workflow may be waiting for work items, because a later work activity cannot be performed until the prior work activities are completed.

Different items may follow different branches of the workflow, and may require the execution of longer activities or a greater number of activities.

Different work items may wait in queue different amounts of time for each activity.

Different work items may be processed by agents with different levels of experience and ability.

Some work items may be intrinsically more complex than others.

Some work items may be suspended by back office agents.

Some work items may be interrupted by interaction work.

This variation makes it difficult for an enterprise to set goals with any hope of achieving a high degree of success. The problem is compounded by allowing the back office agents to work in the "pull" mode.

If the back office agents are operating in the "pull" mode, the queued work items are not being completed based on the goal, thus causing one or more of the work items to miss the goal. Completion time for processing of work items can vary, thus making it difficult for a customer service organization to set goals with any hope of achieving them with a high degree of success. Missed goals result in decreased customer satisfaction and may decrease the value of the business. It is difficult for an enterprise to generate exceptional customer satisfaction and distinguish itself from the competition without being able to commit to and achieve consistent, reliable and timely completion for customers.

One alternative is to process work items on a first-in-first-out (FIFO) basis. The FIFO work system fails to provide a method for selecting a next work item to be processed based on the corresponding goal. Nor does the FIFO system correct the problem for work items that may have been delayed at an early point in the workflow. Instead, the work items progress through each step of the workflow by following the same FIFO work order. Since different work items in the same workflow may have different goals, the work items should progress through the workflow at different rates. Instead, each work item, regardless of goal, is completed in FIFO order.

Another system for completing processing of work items includes the use of priorities. Work items having a short goal may be assigned to a higher priority while work items having a longer goal are assigned to a lower priority. However, a problem arises with completing work activities first for high priority work items in that work items with lower work priorities are not worked until there are no higher priority work items waiting. Thus, high priority work items are over-worked and lower priority work items are under-worked, leading to missed goals for the lower priority work items.

Therefore, a need exists for an automated workflow method for assigning work items to available resources that takes into account the goals set for the individual work items.

Solution

An automated workflow method to assign resources to a plurality of work items based on the commitments made to service the work items, e.g., by a certain time or within a certain period of time. A commitment is assigned to each work item in a workflow—either the same commitment to each work item or different commitments to different work items. The workflow includes work activities to be completed in an assigned order and within the commitment. Each of the individual work activities in the workflow is assigned a threshold which represents a portion of a work item's total commitment. Different work activities are performed by agents within different work groups that have the skills required to perform the corresponding work activities.

When a plurality of work items are being serviced simultaneously, two or more work items may be queued in an activity queue, waiting for a same work activity to be performed. A work activity state of each queued work item is calculated and the work items are stored in the activity queue based on their respective activity state. When an agent receives work items from a single activity queue, the activity state of the queued work items is used to determine which one of the queued work items will be assigned to the next available agent. The commitment assigned to each work item and the threshold assigned to the work activity for each queued work item are utilized to determine an activity state of each queued work item. When an event occurs within the activity queue, the activity state of the queued work items may be recalculated to maintain the work items in an order based on the state of the queued work items. In an embodiment, the activity queue may include one or more timers which activate the recalculation, and therefore the reorganization, of the queued work items. Based on the states of the queued work items, one of the queued work items is assigned to the next available agent to ensure that the work items complete the workflow within their commitments.

An agent may be assigned to receive work items from more than one activity queue. The agent may have one or more regular activity queues from which he is assigned work items and may be assigned to work other activity queues as a reserve or backup agent. The back office agent will only receive work items from a reserve activity queue when the activity state of the reserve activity queue is higher than the activity state of the primary activity queues to which the back office agent is assigned. The back office agent will not be activated to receive work items from an activity queue for which the agent is backup unless there are no work items queued in the back office agents primary activity queues.

In this scenario, which work item is pushed to the available back office agent is first determined by the activity state of the activity queues for which the agent is activated. When two or more activity queues have the same highest activity state, a queued work item from a primary activity queue will be selected first. When more than one primary activity queue has the same highest activity state, the short term predictor, the PCP, of the activity queue is calculated and the work item having the highest PCP is pushed to the available agent.

The PCP, or short term predictor, is calculated using the actual commitment, an elapsed portion of the commitment, and a predicted portion of the commitment that would elapse if the corresponding work item is not processed by the next available agent. Based on the short term predictor, one of the queued work items is assigned to the next available agent as described above.

A long term predictor may also be calculated to avoid missed commitments. The long term predictor is calculated using the actual commitment, the elapsed portion of the commitment, and an estimated portion of the commitment to detect backlogs of work items.

Some of the advantages achievable with the invention include:

Allow an enterprise to define commitments for the completion of the entire back office workflow or segments of the workflow, and to meet those commitments with a high degree of success.

Allow enterprises to reduce overall staffing requirements while at the same time improving the achievement of commitments by dynamically adjusting the pool of the back office agents when the achievement of those commitments is threatened.

Allow an enterprise to define different goals for each unique work item in the same workflow, and to manage the progress of each work item through the workflow process at its own required pace in order for each work item to achieve its own commitment.

Allow an enterprise to make commitments (including different commitments) to their customers, and to achieve those commitments with a high degree of success.

Allow back office agents to operate in pull mode, push mode, or a hybrid of both.

Allow back office agents to participate in both front office and back office activities.

BRIEF DESCRIPTION OF THE DRAWINGS

FIG. 8 illustrates in table form the states of the activity queues of FIG. 7;

FIG. 9 illustrates an activation table for use with the present automated workflow method for assigning work items to resources;

DETAILED DESCRIPTION OF THE DRAWINGS

The automated workflow method for assigning work items to resources summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

A back office business process is defined by a workflow that includes work activities that are to be performed by more than one back office agent in an assigned order. Each back office agent has a set of skills for performing one or more work activities associated with the plurality of work items.

A commitment is a target completion time for a work item to complete either the entire workflow or a particular segment thereof. Each work item being processed through a workflow has a commitment for completing its processing through the workflow. Commitments may be assigned to workflows, i.e., all work items in a workflow may have the same commitment. Alternatively, different work items in the same workflow may have different commitments. Furthermore, a work item may have several different commitments for its processing, covering different segments of the workflow. Commitments may be fixed, defined as a part of the workflow itself, or they may be made in real-time by agents.

The workflow method allows work items within each workflow to be assigned to back office agents by taking into account the commitments of the work items. In other words, the back office agents work in a "push" mode wherein the workflow method automatically assigns a work item to the next available back office agent. Selection of a queued work item is not random. Instead, the selection of a work item to be worked first is made based on the commitments of the queued work items such as to avoid missed commitments.

Figure 1:
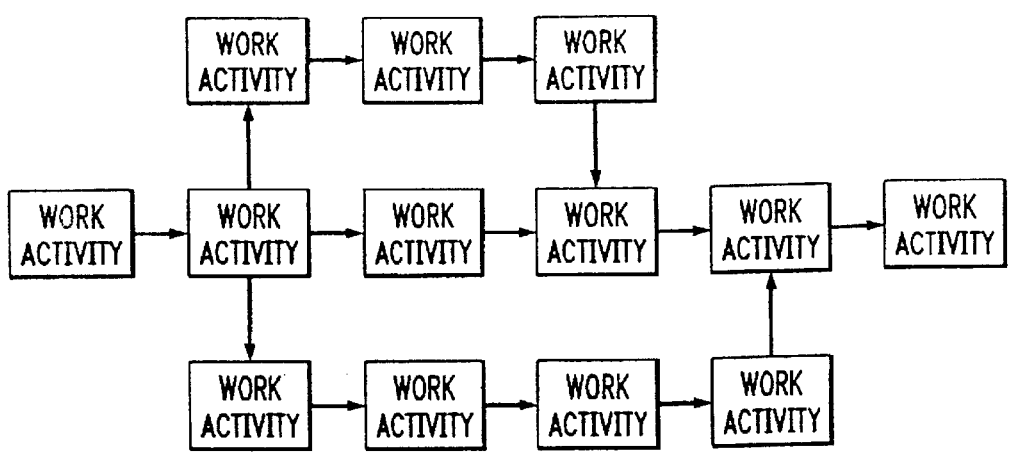
FIG. 1 illustrates in block diagram form a workflow including a plurality of work activities or steps.
Figure 2:
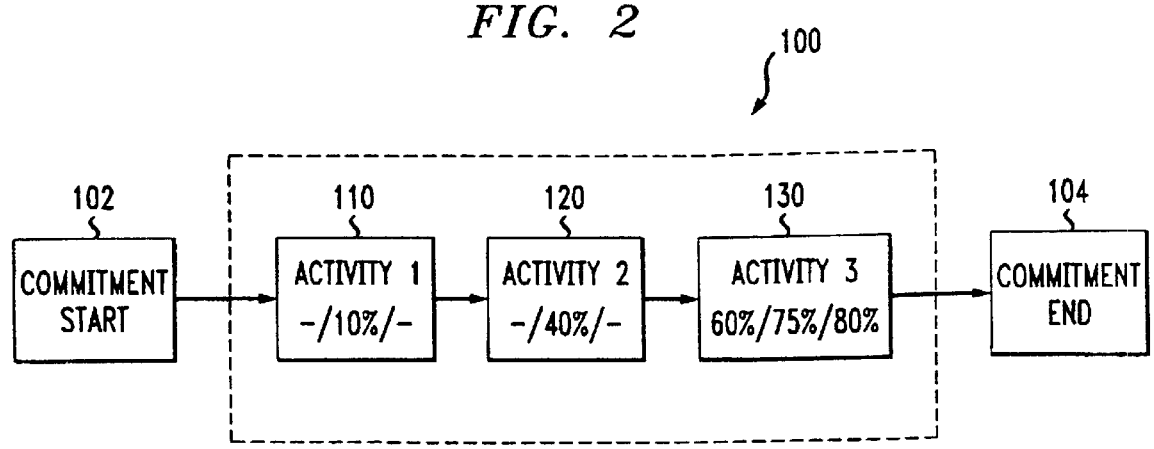
FIG. 2 illustrates in block diagram form a simple workflow including three work activities.
Figure 3:
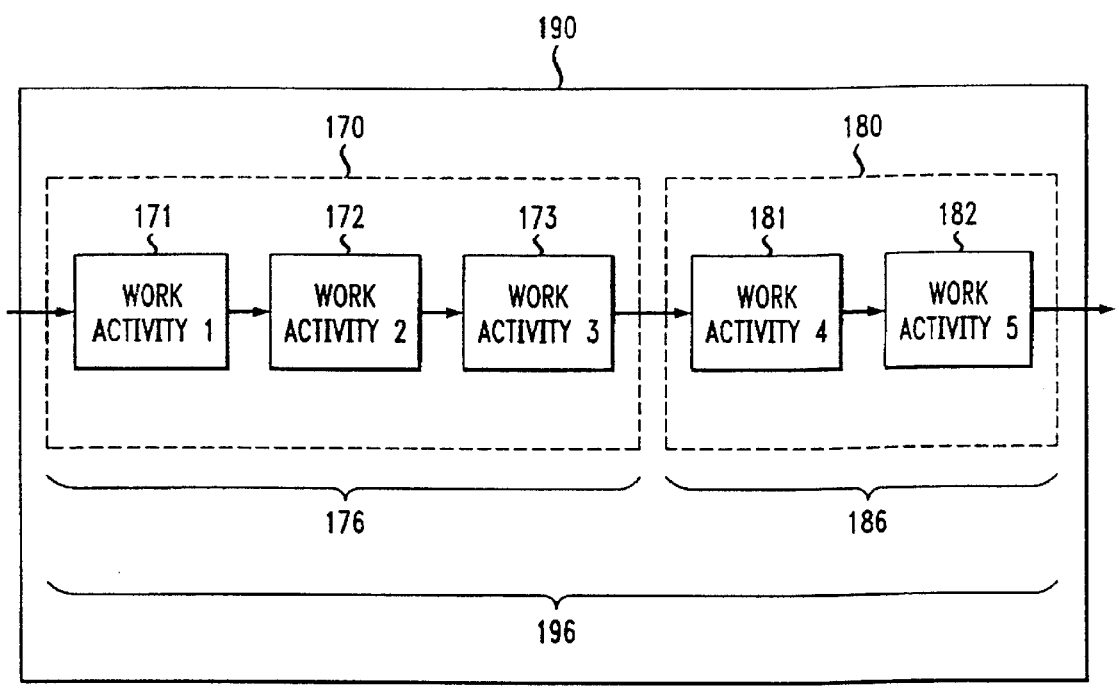
FIG. 3 illustrates in block diagram form a workflow comprising a plurality of other workflow segments.

Workflow—FIGS. 1, 2 and 3:

Referring to FIG. 1, a workflow consists of a sequence of work activities that are necessary to be performed to process a work item to completion. The work activities are in an order in which each successive work activity must be completed. Workflows are frequently complex in nature and usually involve the execution of multiple work activities by multiple back office agents having different skills. Work activities within the workflow may be executed sequentially, conditionally or simultaneously. Each work activity is typically completed by multiple back office agents from different departments or different locations within the enterprise rather than by back office agents working in the same department at the same location.

FIG. 1 illustrates an example of a workflow. Work items enter the workflow at work activity 1, and are then routed in one of two directions at a Branch node. A work item taking the upper route passes through Split node and performs two simultaneous sequences of work activities. The first sequence includes Work Activities 2 and 3 while the second sequence includes Work Activity 4. Work Activity 4 may be executed simultaneously with Work Activities 2 and 3. After both sequences of activities have been completed, the results are synthesized at the Join node, and the work item proceeds to Work Activities 7 and 8, after which the work item exits the workflow. Alternatively, a work item taking the lower route from the Branch node passes through Work Activities 5, 6 7 and 8 sequentially, prior to exiting the work flow For purpose of illustration and discussion of the present workflow method, a simple workflow is used. The workflow 100 of FIG. 2 includes three sequential work activities 110, 120 and 130. The commitment can be an interval of time from the commitment start, or from the current time, or it may be a specific moment in time in the future. Different customers may be given different commitments. For example, a work activity within a workflow may be assigned a one-day target for a gold customer and a two-day target for a silver customer. While the commitment is expressed in terms of time in this example, any other terms may be used.

The commitment includes a commitment start 102 and a commitment end 104, which are assigned to the beginning of the first work activity 110 and to the end of the last work activity 130 in the workflow map 100, respectively. The commitment start time 102 may be the current time, the time that the work item entered the workflow, or the time that the work item is received. The commitment end 104 at the end of the workflow 100 signifies the time by which it is desired that the work item has exited (completed) the workflow. Individual work activities may also be assigned commitment thresholds for accomplishing the individual work activities.

In an alternative embodiment, two or more workflows having individual commitments may be embedded in a higher-level workflow. In this embodiment, illustrated in FIG. 3, the first workflow 170 and the second workflow 180 may be embedded in the third workflow 190. Each one of the workflows is assigned an individual commitment, and the commitment for the third workflow 190 may be a sum of the commitments for the first and second workflows 170 and 180. In this embodiment, the first workflow 170 must be completed before the second workflow 180 can be started. Therefore, the start commitment for the second workflow 180 may be the same as or later than the end commitment of the first workflow 170. For example, the first workflow 170 may have a 5-hour commitment starting at 8 am and ending at 1 pm while the second workflow 180 has a 2-hour commitment starting at 1 pm and ending at 3 pm. Therefore, the start commitment for the third workflow 190 that encompasses the first and the second workflow may have a 7-hour commitment having a start commitment at 8 am and an end commitment at 3 pm.

Figure 4:
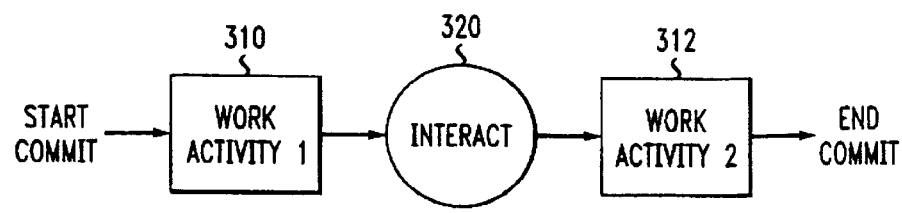
FIG. 4 illustrates in block diagram form a workflow that includes a "front office" interactive, work activity.

In a second alternative embodiment, a back office workflow may include a "front office" activity. In this configuration, illustrated in FIG. 4, a front office activity 320 is required between the first work activity 310 and the second work activity 312. For purpose of illustration, the activity 320 is illustrated as a circle to further differentiate front office activity 320 from work activities 310 and 312. As illustrated, front office activity 320 must be completed before the second work activity 312 can be started. For example, the first work activity 310 may be to perform diagnostics on an automobile. Prior to starting the second work activity 312, which is to perform necessary repairs, the customer has requested a telephone call (front office activity) to provide more detailed information about the repair and associated cost. Although the entire work assignment may be to repair the vehicle for pickup at 5 pm, the second work activity 312 cannot be started until the front office agent has completed the front office activity 320.

The workflow method allows a front office or a back office agent to modify the commitment assigned to a workflow or a work item therein. While work items of the same type may each have a commitment of five business days, the front office agent may expedite one of the work items by assigning a shorter commitment to meet the customer's request for a "RUSH" order. Following this scenario, work items having the same workflow may progress through the workflow at different speeds based on their assigned commitments.

Figures 5, 6:
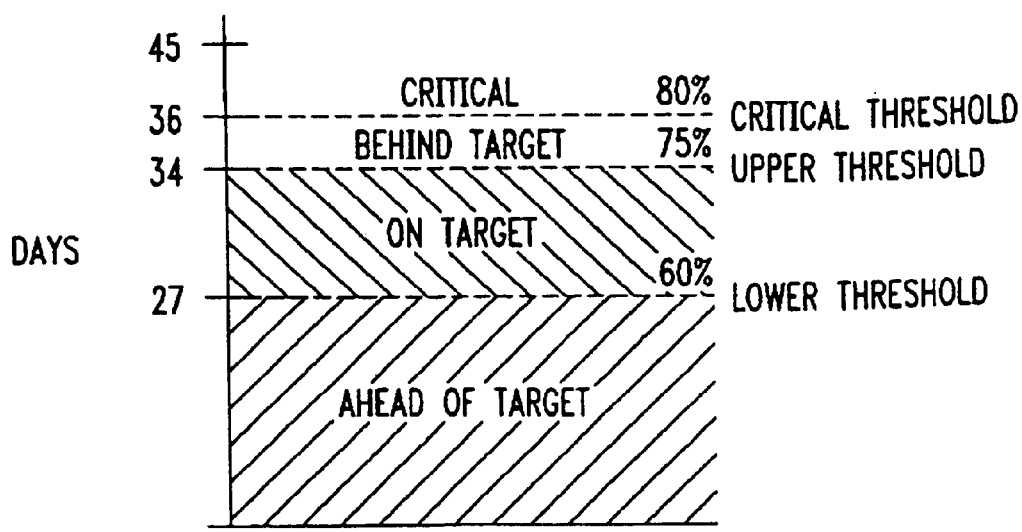
FIG. 5 illustrates in table form the thresholds assigned to the three work items of the workflow of FIG. 2.
FIG. 6 illustrates a graphical representation of the assigned thresholds of FIG. 5.

Setting Work Activity Thresholds—FIGS. 5 and 6:

Work items have thresholds for individual work activities in the workflow. The thresholds are targets for the start of the activity. Referring to the threshold table of FIG. 5, there are three thresholds: a lower level threshold 140, an upper level threshold 150 and/or a critical threshold 160. The upper threshold is required, while the lower and critical thresholds are optional for proper operation. Referring to the workflow 100 of FIG. 2 in conjunction with the threshold table of FIG. 5, the first activity 110 is assigned an upper threshold 152. In this example, the commitment is 45 days to complete the workflow 100, and thus 10% is 4.5 days indicating that the first work activity should be started within 4.5 days. When the enterprise performing the work activity is not typically a 24/7 operation, the time may refer to business days based on the operating hours of the business. If the enterprise operates between the hours of 8 am and 5 pm without overtime, 4.5 days would translate to 40.5 hours to complete the work activity. While the workflow 100 has a commitment of 45 days, the commitment could be in terms of working hours instead of days.

The second work activity 120 is assigned an upper threshold 154 of 40%. Therefore, the second activity should be started prior to using 40% of the total commitment time, or 18 days from the commitment start. The third work activity 130 is assigned an upper threshold 156 and also a lower threshold 146 and a critical threshold 166. These are used to determine the activity state of the work items, as will be discussed in the next section. As work items progress through their respective workflows, a work item may be delayed in a queue. Since there are limited resources available to complete the work items, the workflow method determines the status of each of the queued work items and stores the work item in the activity queue in the order by which the work items are to be "pushed" to the next available back office agent having the requisite skills. Whenever an event occurs, such as a new work item being queued or a work item being assigned to a next available agent, the state of the activity queue is determined. When a new work item is added to the activity queue, the state of the work item is calculated, and the work items are again arranged in the order in which the queued work items should be worked.

An activity queue may have one or more timers associated with the activity queue. A timer may be set to recalculate one or more activity states of the queued work items based on a time-of-day, or the expiration of a time period. For example, a timer may be set to initiate a recalculation at the time that the activity state of a queued work item transitions from one state to a next higher state, such as transitioning from behind target to critical. Since each queued work item may have a different commitment, the queued work items will transition to a next activity state at different times. Thus, storing the work items in the activity queue based on the state of the work items, the transition from one state to a next higher state may change the order in which the work items are queued. If the work items for which the timer is set is removed from the activity queue, the timer is cancelled. However, since removing a work item from the activity queue is an event, the activity state of the remaining work items is determined and the work items reorganized.

A back office agent may be eligible to receive work items from more than one activity queue. Therefore, the activity state of each activity queue must be determined. In one embodiment, the activity state of each activity queue is determined by the state of the first queued work item. Other embodiments are possible, for example, the activity state of a queue could also depend on the number of work items in that queue. When a back office agent becomes available, the state of each activity queue is checked and a work item from the activity queue having the worst activity state is pushed to the available back office agent. While the order in which the work items are queued within the activity queue has been described as queued based on the state of each work item, alternative methods for assigning an order to the work items within the activity queue may be substituted. For example, work items may be stored in an order based on the time that the queued work items are to be serviced. In this example, one work item may need to be serviced by 9 pm and another queued work item may need to be serviced by 10 pm. Therefore, the work item needing service by 9 pm would be positioned at the front of the queue for assignment to the next available agent. The commitments assigned to the work items and the thresholds assigned to the work activities are utilized to determine the state of the individual work items and the activity state of each activity queue. FIG. 6 illustrates graphically the thresholds assigned to the third work activity 130 within the workflow 100 of FIG. 2. The upper threshold 152 of the first work activity within the workflow 100 is lower than the upper threshold 154 of the second work activity, which in turn is lower than the upper threshold 156 of the third work activity. If the first work activity 110 and the second work activity 120 are started prior to their upper threshold, third work activity 130 can be expected to be accomplished within the commitment period. However, if there are other work items queued in other activity queues that are competing for attention, third work activity 130 may miss the assigned commitment unless each of the activity queues are continually evaluated to determine which queued work item from which activity queue should be assigned to the next available agent.

Work Activity State—FIGS. 2, 5 and 6:

The activity state of an activity queue may be determined by the Actual Commitment Percentage (ACP) of the first queued work item within that activity queue based on the threshold assigned for that activity to the first work item. The ACP is expressed as a percentage of the commitment. It is calculated as the Actual Elapsed Time (AET) from the commitment start 102 divided by the commitment duration:

ACP=[(Actual Elapsed Time)/(Commitment Duration)]*100

For example, the activity queue for activity 3 would be considered:

"On target" if its PCP is <=75%

"On target"—Immediate Risk" if its PCP is >75%

"Behind target" if its ACP is >75%

"Critical" if its ACP is >80%.

The thresholds are used to evaluate the state that in turn is used for the selection of work items from activity queues and for the activation and deactivation of reserve and backup agents. For example, assume that there are two work items queued in the activity queue for the third work activity 130 of FIG. 2. The first work item has a commitment of 45 days, and the second work item has a 60-day commitment. The ACP of each of the two queued work items is calculated and compared to the activity threshold of the third work activity 130 to determine the state of each work item. The work activity 130 has a lower threshold 146 of 60%, an upper threshold 156 of 75% and a critical threshold 166 of 80% as illustrated in FIGS. 5 and 6. The first work item has taken 34 days to reach this activity queue and the second work item has taken 40 days. In other words, the first work item has used 75% of its commitment time and the second work item has used 67% of its commitment time.

Based on the thresholds assigned to the work activity, the first work item has reached the upper threshold, and the other queued work item is between the lower threshold 146 of 60% and the upper threshold 156 of 75%. Referring to the graphical threshold representation of FIG. 6, queued work items below the lower threshold 146 are ahead of target, while work items with an elapsed time between the lower threshold 146 and the upper threshold 156 are on target. Since 75% of the commitment time for the first work item has expired, the first work item is on target with a risk of getting behind target if any more time elapses. Based simply on the ACP of the queued work items, the first work item would be assigned to the next available agent.

Evaluating the queued work items based on their actual commitment provides a method for assigning work items to reduce the number of missed commitments. However, when an activity queue includes multiple work items having a variety of commitments and elapsed times, more than one work item may be behind target or critical. Therefore, the workflow method calculates a predicted commitment percentage to determine in which order queued work items should be completed.

Predicted Commitment Percentage:

One of the driving factors for assigning the appropriate work item to the next available agent is the Predicted Commitment Percentage (PCP). The PCP is a short-term predictor which takes into account "what if" scenarios by using a Predicted Elapsed Time (PET) for a work item if a back office agent chooses not to service the work item at this time. PET is the total time predicted to have elapsed before the next back office agent with the required skills will become available to service the work item. PET is the AET plus a Weighted Advance Time (WAT) for the activity queue.

Predicted Elapsed Time:

PET=AET+WAT

The PCP is calculated as the PET divided by the commitment duration.

Predicted Commitment Percentage:

PCP=[(PET)/(Commitment Duration)]*100

A detailed description of the Weighted Advance Time (WAT) can be found in U.S. Pat. No. 5,506,898.

Example 1: two work items in the same activity queue have the same commitment of 10 hours. One work item has taken 3 hours to reach this point but the other was suspended during an earlier activity and has taken 5 hours to reach the same point in the workflow. The activity has a WAT of 1 hour. The PCPs of the two work items are therefore 40% ((3+1)/10*100) and 60% ((5+1)/10*100), respectively. The work item with the highest PCP, the delayed work item, is selected first for processing.

Example 2: two work items in an activity queue have 5 elapsed hours and 10 elapsed hours since they were started. One has a commitment of 10 hours, the other 20 hours. Both have ACPs of 50%. The activity has a WAT of 1 hour. This gives the first work item a PCP of 60% ((5+1)/10*100) and the second a PCP of 55% ((10+1)/20*100). In this situation, the first work item would be selected for processing first because it has the higher PCP. In this manner, work items with more aggressive goals get a boost from PCP, which in turn improves the business's ability to set and achieve customer commitments consistently.

Example 3: a back office agent is one of a very few agents trained for activity A and one of many agents trained for activity B. There is one work item in each activity queue when this agent becomes available. Both work items have 10-hour commitments and ACPs of 40% and 50%, respectively, suggesting that perhaps activity B should be selected. The WAT for activity A is 3 hours, the WAT for work item activity B is 30 minutes. The PCPs are therefore 70% and 55%, respectively, and so this agent would be assigned to process activity A. In this manner, the exceptionally long delays that occur naturally in traditional systems for activities served by a small number of employees are avoided.

The system moves work items through a workflow at an appropriate speed relative to their progress and their objectives, but PCP gives a boost to the work items that are most at risk, which in turn improves the enterprise's ability to set and achieve customer commitments consistently.

In the alternative embodiment illustrated in FIG. 3, thresholds are assigned to the work activities and the actual and predicted commitment percentages are calculated following the same formulas. However, each work item may have more than one ACP. The work items may have an ACP calculated using the commitment for workflow 170, another ACP calculated using the commitment for workflow 180, and yet another ACP calculated using the commitment for workflow 190. While the first workflow may have an aggressive commitment which produces a first ACP above the upper threshold, the commitment for the third workflow may be more relaxed resulting in a third ACP below the upper commitment, thus indicating that the work item is on target. In this example, a queued work item having an ACP that is higher than the third ACP may be assigned to the next available agent. Conversely, a first work item may be ahead of target based on a relaxed first commitment thus producing a lower ACP. If a second work item has a more aggressive commitment, the ACP of the second work item may be higher than the ACP of the first work item. In this scenario, the queued work item having the highest ACP may be assigned to the next available agent.

The boost provided by using PCP to push a work item to a next available agent allows work activities that have been previously delayed in another activity queue to be pushed ahead through subsequent work activities until the problem is corrected and the work item is no longer at risk for missing its assigned commitment. The boost also allows work items that have a more aggressive commitment to progress through a workflow at a faster rate than those with more relaxed commitments.

Calculating both the ACP and the PCP allows the workflow method to move work items through each workflow at an appropriate speed relative to their progress and their assigned commitments. Calculating the PCP gives a boost to the work items that are most at risk of missing their assigned commitment. The workflow method may also calculate a long-term predictor, the Expected Commitment Percentage (ECP), to detect scenarios where a backlog of work items is queued.

Expected Commitment Percentage:

The workflow method provides a way of avoiding missed commitments instead of fixing work assignments that have missed their commitment. ECP is a long-term predictor used to detect backlogs of work items and to dynamically invoke reserve or backup agents to process the queued work items before any work items miss their commitments. The ECP of an activity queue is calculated from the Expected Elapsed Time (EET) of the last work item in a queue using the actual elapsed time (AET) of the last queued work item plus the product of the WAT and the queue position of the last queued work item, referred to as QPOS for Queue POSition.

The QPOS of each successive queued work item is the work item's position within the activity queue relative to the other queued work items. For example, the first work item within the activity queue has a queue position, QPOS=1. The Weighted Advance Time (WAT) is multiplied by QPOS to determine the estimated time for which the last queued work item is expected to be queued before being pushed to the next available agent in a FIFO system. ECP is calculated according to Estimated Elapsed Time (EET):

EET=AET+QPOS*WAT

Estimated Commitment Percentage (ECP):

ECP=[(EET)/(commitment-duration)]*100

Both PCP and ECP predictors are used to push work items to a next available agent to allow work items to progress through their workflow. ECP also "looks ahead" to predict queued work items and to dynamically reassign agents with multiple skills toward those activities for which there may be fewer trained employees or toward activity queues experiencing a heavier than expected volume of work items.

PCP and ECP are sensitive to work items that have been previously delayed and help to speed those work items through subsequent activities until the problem is corrected. They advance work items with aggressive commitments at a faster rate than those with more relaxed commitments. They help steer back-office agents with multiple capabilities towards those activities for which there are few trained agents. They help to detect logjams, when too many work items are waiting to be served at a particular activity in the workflow.

Figure 7:
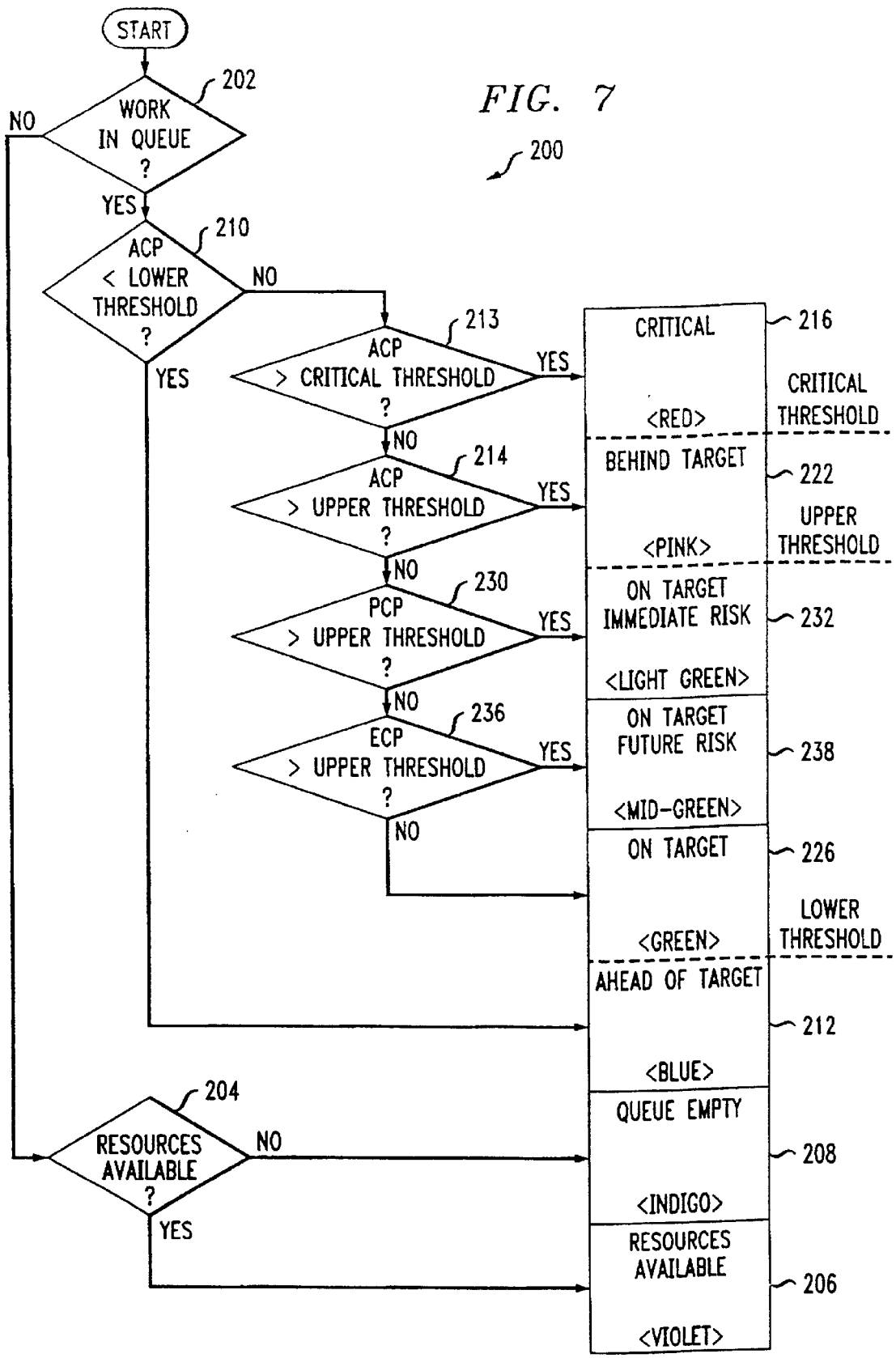
FIG. 7 illustrates a flow diagram of a method for determining the state of activity queues according to the present automated workflow method for assigning work items to resources.

Activity State Assignment—FIGS. 7 and 8:

The workflow method continuously monitors each activity queue to determine the state of the activity queue. Referring to the operational flow diagram of FIG. 7, the right-hand column of blocks is a list of activity states of the activity queue. When there is a balance between work items arriving at a queue and agents processing those work items, work items are usually not queued in step 202, resources are not idle in step 204, and the queue is empty, resulting in a "queue empty" state in step 208. If resources are available in step 204, the activity state assigned to the activity queue is "resources available" in step 206. However, when work items are arriving at the activity queue at a faster rate, work items may be queued in step 202 in the activity queue.

When there are work items in the activity queue in step 202, the ACP of the first queued work item is calculated and if the ACP of the first queued work item is lower in step 210 than the lower threshold assigned to the work item, the activity queue is assigned an activity state "ahead of target" in step 212. If the ACP is greater than the lower threshold in step 210, the work item ACP is compared to the critical threshold at step 213. An ACP greater than the critical threshold results in a "critical" activity state in step 216. The upper threshold of the work item is compared to the ACP when the ACP is less than the critical threshold in step 214. If the ACP is greater than the upper threshold in step 214 and less than the "critical" threshold in step 213, the activity queue is assigned an activity state of "behind target" in step 222. In step 214, when the ACP of the work item is less than the upper threshold of the work item, the Predicted Commitment Percentage of the queued work item is calculated in step 230.

The short-term predictor, PCP, uses a predicted elapsed time before the next agent will become available to calculate a PCP for the work item to take into account the time that the queued work item will be queued before being pushed to the next available agent. If the PCP for the work item is above the upper threshold in step 230, the activity queue is given a state of "on target but immediately at risk" of missing the assigned commitment, in step 232. When the PCP of the work item is below the upper threshold of the work item in step 230 the ECP of the work items is calculated in step 236.

ECP is the long-term predictor used to identify potential activity queue backlogs so that reserve or backup agents can be invoked to resolve the problem before commitments are missed. Unlike ACP and PCP, which focus on the work item at the head of the queue, ECP uses the work item at the end of the queue. If the ECP is below the activity queue upper threshold in step 236, the activity queue is assigned a state of "on target", at step 240. However, when the ECP is above the upper threshold in step 236, the activity queue is assigned an activity state of "on target but future risk" in step 238.

The list of activity states of the queue, the meaning of each activity state and the formula for determining the activity sate is illustrated in FIG. 8 in a table format. The activity states are used by the workflow method to manage the workload assigned to the back office agents and reduce or eliminate missed commitments, thus providing resource management.

Operationally:

A back office agent may be assigned to accept work items from more than one activity queue. Referring to FIG. 9, each back office agent may have one or more roles that relate to his role in accepting work items from activity queues. In the example illustrated in FIG. 9, the back office agent is assigned work items from activity queues 1 and 2 as regular work. The back office agent may be pushed work activities from any one of the regular activity queues based on the activity state of the regular activity queue.

The back office agent may also have a reserve role in another activity queue, activity queues 3 and 4 in this example. As a reserve back office agent, a work item from activity queue 3 will only be pushed to the reservist back office agent when the activity state of the reserve activity queue is greater than or equal to the activation level of the reserve agent and the activity state of the activity queues from which the back office agent regularly receives work items from has a lower activity state. Therefore, given the agent roles of FIG. 9, the back office agent would only be considered for work items from activity queue 3 when that activity queue reached or exceeded an activity state of immediate risk. The agent would not get work from activity queue 4 unless activity queue 4 was in a state of behind target or critical. For work items from activity queues 3 and/or 4 to be chosen for the back office agent, the activity queue 3 and/or 4 must be in a worse state than regular activity queues 1 and 2.

As back-up for activity queue 5, the back office agent will only receive work items from activity queue 5 when there are no work items queued in regular activity queues 1 and 2 and the activity state of the backup activity queue 5 is greater than or equal to the activation level of the backup agent.

Figure 10:
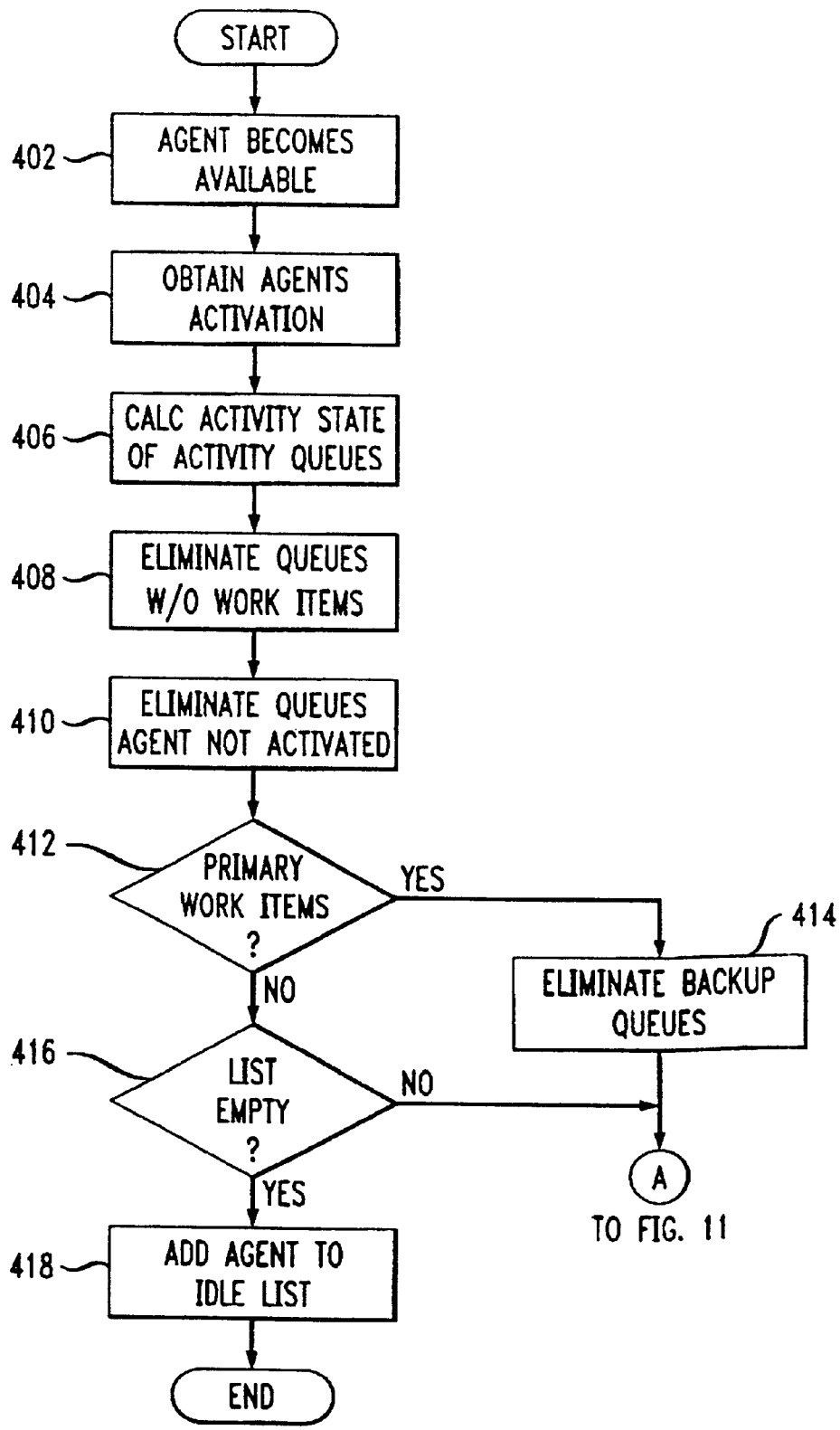
FIG. 10 illustrates a flow diagram of the steps for selecting a work item for an available agent according to the activation table of FIG. 9.

Referring to the flow diagram of FIG. 10 in conjunction with the activation table of FIG. 9, when a back office agent becomes available in step 402, the activity queues for which the back office agent is activated is first determined in step 404, activity queues 1–5 in this example. The activity states of the activity queues is calculated in step 406 based on the state of the first and last work items in the corresponding activity queue. In step 408, the activity queues having no queued work are eliminated. According to the activation table of FIG. 9 and using the calculated activity states from step 406, the activity queues for which the back office agent is not yet activated are eliminated in step 410. If there are work items in a primary activity queue in step 412 the activity queues for which the back office agent is backup are eliminated in step 414 since the back office agent is not activated for back up work items unless there are no primary activity queues having queued work items. If there are not work items in any of the activity queues that the back office agent is activated to receive, the back office agent is added to a list of idle agents in step 418.

Figure 11:
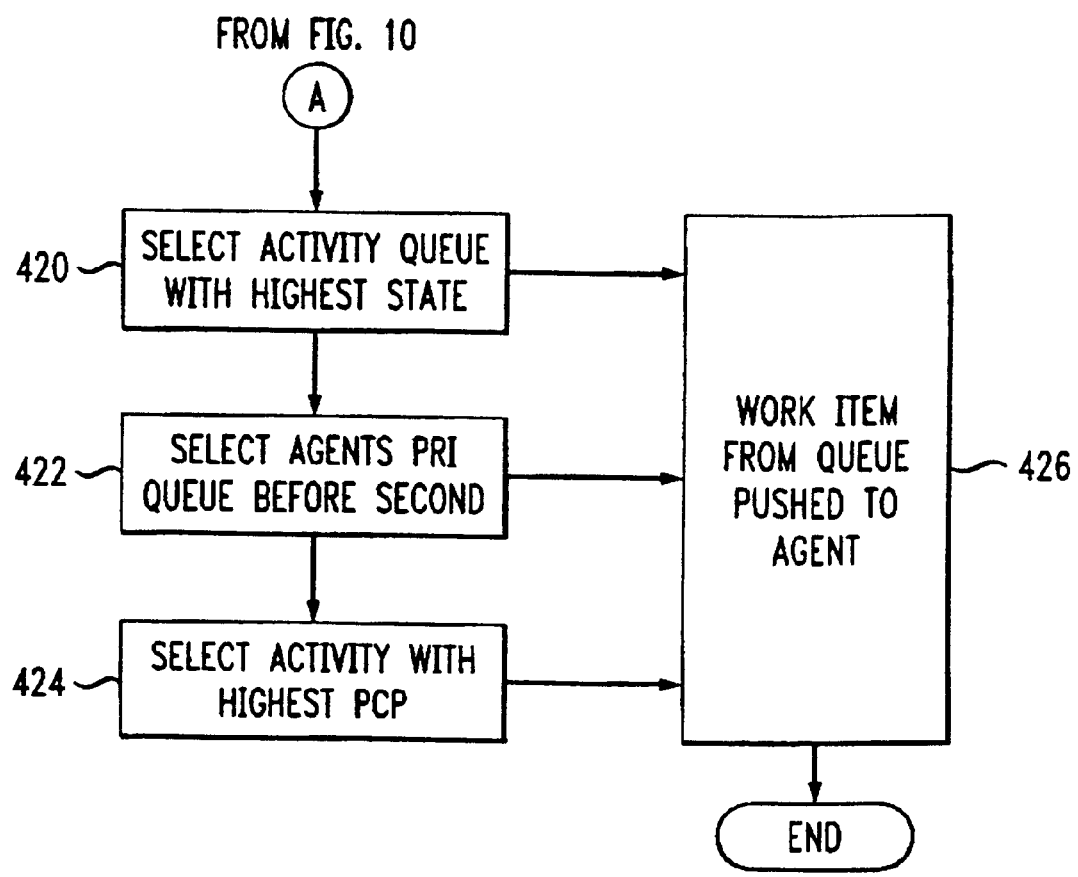
FIG. 11 illustrates a flow diagram that is a continuation of the flow diagram of FIG. 10.

Referring to the flow diagram of FIG. 11, if there are work items pending in two or more activity queues, the automated workflow method for assigning work items to resources determines which queued work item should be pushed to the available agent. In step 420, the work item in the activity queue having the highest activity state is pushed to the available back office agent in step 426 unless two or more activity queues have the same highest activity state. When two or more activity queues have the same highest activity state, the work item from a primary activity queue is pushed to the back office agent in step 426 if there is only one primary activity queue having the highest activity state. If two or more primary activity queues have the same highest activity state, the PCP of the activity queue is calculated in step 424 and a queued work item from the activity queue having the highest PCP is pushed to the available back office agent in step 426. Likewise, when two or more reserve activity queues have the same highest activity state and there are no regular activity queues with that or a higher activity state, the work item having the highest PCP is pushed to the available back office agent in step 426.

Unlike the prior art resource management system which operates following similar activation levels, the present automated workflow method for assigning work items to resources calculates an activity state and PCP of the activity queue, which are calculated as a percentage.

Resource Management:

Reserve and backup back office agents may be assigned an activation level for becoming eligible to service activity queues. When the activity state of the activity queue is equal to or greater than the activation level of a qualified reserve agent and the backup agent does not have any primary work to service, the reserve agent becomes available to service work items from the backlogged activity queue. The activity state of an activity queue is the worst activity state of any work item enqueued therein, i.e., the activity state of the enqueued work item that is most in danger of missing its target. Thus, the present workflow method may dynamically assign one or more reserve and/or backup agents from other work groups to service queued work items from the backlogged activity queue to reduce present and future missed commitments.

In another embodiment, a work item being serviced by an agent may be interrupted when a work item is "pushed" to the agent. The workflow method may have an assigned interruption level that may be linked to the activity state of the backlogged activity queue. The work item that is the furthest ahead of schedule or with the lowest ACP or PCP or the longest remaining commitment time may be selected for interruption, while work items that are behind target may be prohibited from being interrupted. Alternatively, a combination of such factors may be used to select a work item for interruption.

Work Environment:

The workflow method may distribute work items to agents in a mixed push and pull environment. When a next agent becomes available in a push environment, the best-selected work item is automatically pushed to the available agent. In a pull environment, a list of work items is displayed to the available agent on the agent's desktop.

The agent is given the responsibility of selecting which work item to service next. The agent may be provided with a recommendation for which work item should be serviced next. In the pull environment, the agent's choice may be influenced by providing the appropriate information so that the agent is informed of the activity state of the activity queue and the actual and predicted commitment percentages for the individual work items. In a mixed push-pull environment, the agent's selection may be further influenced by displaying only a subset of the queued work items in a work list. For example, only "at-risk" work items may be displayed when one or more at-risk work items are queued. The available agent may accept the recommendation, select a different work item, or request the best work item to be selected and pushed to the agent from a subset of the work list displayed to the agent.

Alternative embodiments will occur to those skilled in the art. Although the workflow method has been described for sequential work items, alternative workflows could be substituted. Similarly, although embodiments were described and illustrated with less than five work activities, more complex workflows may be substituted. Such variations and alternatives are contemplated, and can be made without departing from the spirit and scope of the invention claimed in the appended claims.

It is apparent that there has been described an automated workflow method for assigning work items to resources that fully satisfies the objects, aims, and advantages set forth above. While the workflow method has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed:

1. A method for assigning work items to resources in a workflow including one or more work activities that are completed in an assigned order, comprising:

assigning a commitment for completion of the workflow to each of a plurality of work items;

assigning a threshold for each of said work activities to each said work item, wherein said threshold is a portion of said commitment of said work item;

automatically determining a work activity status of each said work item from said commitment, said threshold, and an elapsed portion of said commitment of said work item; and assigning one of said work items to a next available resource according to said work activity status.

2. The method of claim 1 wherein assigning a commitment to said work item comprises:

assigning a commitment workflow start to said work item for a first work activity of said work activities within said workflow; and assigning a commitment workflow end to said work item for a last work activity of said work activities within said workflow.

3. The method of claim 1 for assigning work items to resources in a plurality of workflows each including a plurality of work activities that are completed in an assigned order, wherein of said workflows have at least one common work activity.

4. The method of claim 1 wherein assigning a threshold comprises:

assigning an upper threshold to each of said work items for each of said work activities, wherein a work item above said upper threshold is behind target and a work item below said upper threshold is on-target.

5. The method of claim 1 wherein determining a work activity status comprises:

queuing a plurality of said work items for one of said work activities; and predicting a short term predictor for each of said work items using said commitment, said elapsed portion of said commitment, and a predicted commitment portion of said work item.

6. The method of claim 1 further comprising:

queuing a plurality of said work items for one of said work activities;

predicting a long term predictor for each one of said work items using said commitment, said elapsed portion of said commitment, and an estimated portion of said commitment of said work item; and automatically invoking reserve and backup resources to service said queued common work items to avoid missed commitments.

7. The method of claim 1 wherein assigning one of said work items comprises:

automatically assigning one of said work items waiting for one of said work activities to a next available resource having a skill to perform said activity according to said work activity status of said waiting work items.

8. The method of claim 1 wherein assigning one of said work items comprises:

providing said work activity status of said work items to a resource; and the resource selecting one of said work items to be completed by said resource.

9. The method of claim 1 further comprising:

queuing a plurality of said work items for one of said work activities;

predicting a short term predictor for each one of said work items using said commitment, said elapsed portion of said commitment, and an estimated portion of said commitment of said work item;

organizing said plurality of work items in a work activity queue based on said short term predictor; and automatically assigning a first queued work items from said plurality of work items to said next available resource based on said organization of said plurality of work items in said queue.

10. The method of claim 1 wherein said next available resource is eligible to receive work items from two or more work activities further comprising:

queuing a work item for each of said two or more work activities in a corresponding activity queue;

predicting a short term predictor for a first work item in said corresponding activity queue using said commitment, said elapsed portion of said commitment, and an estimated portion of said commitment of said work item;

organizing said work item in said corresponding activity queue based on said short term predictor; and automatically assigning a first queued work items from said corresponding activity queue to said next available resource based on said short term predictor of said first work items in said corresponding activity queues.

11. A method for assigning work items to resources in a workflow for said work items, said workflow including two or more work activities that are completed in an assigned order, comprising:

assigning a commitment to each of said work items wherein said commitment is time available to complete said work item;

assigning a threshold to two or more of said work items for a common one of said work activities, wherein each said threshold is a percentage of said commitment of corresponding said work item;

automatically determining a work activity status for each of said two or more work items from said commitment, said threshold, and a duration of elapsed time in said workflow of said work item; and automatically assigning one of said work items waiting for said common work activity to a next available resource according to said work activity status.

12. The method of claim 11 wherein determining a work activity status comprises:

queuing said two or more work items for said common work activity; and predicting a short term predictor for each of said two or more work items using said commitment, said duration of elapsed time, and a predicted elapsed time of said work item.

13. The method of claim 11 wherein predicting a short term predictor comprises:

calculating a predicted elapsed time according to a sum of an actual elapsed time from a start of said commitment plus a weighted advance time until said next available resource is expected to become available to service one of said two or more work items; and dividing said calculated predicted elapsed time by said duration of said commitment to calculate a predicted commitment.

14. The method of claim 11 further comprising:

automatically invoking reserve and backup resources to service said two or more work items based on said work activity status to avoid missed commitments.

15. The method of claim 14 wherein automatically invoking reserve and backup resources comprises:

queuing said two or more work items for said common work activity;

predicting a long term predictor for each one of said two or more work items using said commitment, said duration of elapsed time, and an estimated wait time for each of said queued work items; and automatically invoking said reserve and backup resources to service said queued work items to avoid said missed commitments.

16. The method of claim 15 wherein predicting a long term predictor comprises:

calculating an estimated elapsed duration as a sum of actual said duration of elapsed time plus a product of a position of a last one of said work items within an activity queue and a weighted advance duration until said next available resource becomes available; and dividing said estimated elapsed duration by said duration of said commitment to calculate an estimated commitment.

17. The method of claim 11 wherein assigning a commitment to said work assignment comprises:

assigning a commitment workflow start to said work item for a first work activity of said work activities within said workflow; and assigning a commitment workflow end to said work item for a last work activity of said work activities within said workflow.

18. The method of claim 11 further comprising:

creating a work flow for each one of said plurality of work items, wherein creating a workflow comprises assigning a plurality of work activities to the workflow, wherein one or more of said plurality of work activities within the work flow are common to another one or more of the work flows, and assigning an order for completing said plurality of work activities in the workflow; and assigning a commitment workflow start and a commitment workflow end for a first one and a last one of the plurality of work activities, respectively, to a work item.

19. The method of claim 11 wherein assigning a threshold comprises:

assigning an upper threshold to a work item for each of said two or more work activities, wherein a work item having a work item status above said upper threshold is behind target and a work item having a work activity status below said upper threshold is on-target.

20. The method of claim 19 further comprising:

assigning a critical threshold to a work item for each of said two or more work activities, wherein any work item having said work activity status above said critical threshold is critical and any work item having said work activity status between said upper threshold and said critical threshold is behind target; and assigning a lower threshold to a work item for each of said two or more work activities, wherein any work item having said work activity status below said lower threshold is ahead of target and any work item having said work activity status between said lower threshold and said upper threshold is on target.

21. The method of claim 11 wherein automatically calculating a work activity status comprises:
for each of said common work activities,
predicting a wait time until a resource becomes available to perform one of said common work activities according to an average availability time;
summing said predicted wait time and said duration of elapsed time of a work item to generate a predicted elapsed time of the work item; and
calculating said work activity status of the work item as a percentage of said commitment of the work item using to said predicted elapsed time.

22. The method of claim 11 further comprising:
creating a first workflow for one of the work items, wherein said first workflow includes a first subset of a plurality of work activities;
assigning a first commitment to said first workflow, said first commitment having a first start commitment and a first end commitment at a beginning and an end of said first workflow;
creating a second work flow for another of the work items, wherein said second workflow includes a second subset of said plurality of work activities, said first and said second subset having at least one work activity in common; and
assigning a second commitment to said second workflow, said second commitment having a second start commitment and a second end commitment at a beginning and an end of said second workflow.

23. The method of claim 11 further comprising:
creating a first workflow for one of the work items, wherein said first workflow includes a first subset of a plurality of work activities;
assigning a first commitment to said first workflow, said first commitment having a first start commitment and a first end commitment at a beginning and an end of said first workflow;
creating a second workflow for said one of the work items, wherein said second workflow includes a second subset of said plurality of work activities;
assigning a second commitment to said second workflow, said second commitment having a second start commitment and a second end commitment at a beginning and an end of said second workflow; and
assigning a third commitment to a combination of said first workflow and said second workflow wherein said start commitment of said first work flow is a third start commitment and a third end commitment is said second end commitment of said second workflow, wherein the third commitment is the duration required to complete said first workflow and said second work flow.

24. The method of claim 11 wherein two or more of said plurality of work items follow a same workflow further comprising:
assigning a different commitment to each of said plurality of work items, wherein said plurality of work items progress through said work flow at different rates according to the commitment assigned to each corresponding one of each of said plurality of work items.

25. A method for a plurality of agents within two or more workgroups to process a plurality of work items within a completion commitment of each of said plurality of work items through at least one workflow corresponding to the work items and including a plurality of activities to be completed in an assigned order by said plurality of agents, wherein agents in each of the workgroups have a skill corresponding to an activity performed by said work group, comprising:
assigning said commitment to each of said workflows including a start commitment assigned to a first one of said plurality of activities and an end commitment assigned to a last one of said plurality of activities, wherein said commitment is a time available to complete said corresponding workflow;
assigning a threshold to each of said plurality of activities, wherein said threshold is a percentage of said commitment;
automatically calculating an activity state, said calculation using said corresponding commitment and an elapsed time associated with each one of said queued work items; and
automatically assigning one of said queued items to a next available agent within said corresponding workgroup according to said activity state calculated for each of the queued work items, wherein said one of said queued work items having a worst activity state is completed first to prevent a missed commitment for said work item.

26. A product that assigns work items to resources in a workflow including one or more work activities that are to be completed in an assigned order, the product comprising:
instructions for directing a processor to:
assign a commitment for completion of said workflow to said work item;
assigning a threshold of said one or more work activities to said work item,
wherein said threshold is a portion of said commitment of said work item;
queue said work item in an activity queue;
determine a status of said queued work item;
organize said queued work items based on said status; and
assign a next one of said queued work items to a next available resource based on said organization of said queued work items.

27. The product of claim 26 wherein said instructions further comprise instructions for:
assigning a commitment workflow start to said work item for a first work activity of said one or more work activities within said workflow; and
assigning a commitment workflow end to said work item for a last work activity of said one or more work activities within said workflow.

28. The product of claim 26 wherein said instructions further comprise instructions for assigning an upper threshold to each of said work items for each of said one or more work activities, wherein a work item above said upper threshold is behind target and a work item below said upper threshold is on target.

29. The product of claim 26 for assigning a plurality of work items to resources in plurality of workflows each including a plurality of work activities that are completed in an assigned order, wherein said workflows have at least one common work activity having a corresponding common activity queue.

30. The product of claim 29 wherein said instructions further comprise instructions for:
queuing said plurality of work items in said common activity queue corresponding to said at least one common work activity;
predicting a short term predictor for each of said plurality of work items using said commitment, an elapsed portion of said commitment, and an estimated portion of said commitment of said corresponding work item;

organizing said plurality of work items in said common activity queue based on said short term predictor of said queued plurality of work items; and assigning a first queued work items from said plurality of work items to said next available resource based on said organization of said plurality of work items in said common activity queue.

31. The product of claim 26 wherein said next available resource is eligible to receive said work item from two or more activity queues wherein said instructions further comprise instructions for determining an activity state of said two or more activity queues and assigning said next one of said queued work items to said next available resource based on said activity state of said corresponding activity queue.

32. The device of claim 31 wherein said instructions further comprise instructions for:

queuing one or more of said work items for each of said two or more activity queues;

predicting a short term predictor for a first work item in said two or more activity queues using said commitment, an elapsed portion of said commitment, and an estimated portion of said commitment of said work item;

organizing said work items in said two or more activity queues based on said short term predictor; and automatically assigning a first queued work item from a corresponding one of said two or more activity queues to said next available resource based on said short term predictor of said first work items in said two or more activity queues.

33. The product of claim 26 wherein said instruction further comprise instructions for:

providing said calculated state of said work item to a resource; and selecting one of said work items to be serviced by said resource.

* * * * *